United States Patent [19]

Smith et al.

[11] Patent Number: 4,764,588

[45] Date of Patent: Aug. 16, 1988

[54] INSOLUBLE VINYL LACTAM CLARIFIERS

[75] Inventors: Terry E. Smith, Morristown; Ian W. Cottrell, Kinnelon; John D. Pelesko, Roselle, all of N.J.

[73] Assignee: GAF Corporation, Wayne, N.J.

[21] Appl. No.: 23,318

[22] Filed: Mar. 9, 1987

[51] Int. Cl.$^4$ .......................... C08F 6/00; C08F 6/24; C08F 26/10; B01D 37/02

[52] U.S. Cl. .................... 528/481; 528/499; 528/503; 526/264; 525/326.9; 525/383; 210/735; 210/777; 426/330.3; 426/330.4; 426/330.5; 426/424; 264/345; 264/347

[58] Field of Search .................. 528/481, 499, 503; 428/402; 526/264; 525/326.9, 383; 210/735, 777; 426/330.3, 330.4, 330.5, 424; 264/345, 347

[56] References Cited

U.S. PATENT DOCUMENTS

| | | | |
|---|---|---|---|
| 2,914,516 | 11/1959 | Siggia et al. | 528/483 |
| 3,072,615 | 1/1963 | Riedesel | 528/486 |
| 4,051,113 | 9/1977 | Kissel et al. | 528/499 |
| 4,180,633 | 12/1979 | Dixon | 55/326.9 |
| 4,433,112 | 2/1984 | Straub et al. | 525/326.9 |

Primary Examiner—Joseph L. Schofer
Assistant Examiner—F. M. Teskin
Attorney, Agent, or Firm—Marilyn J. Maue; Joshua J. Ward

[57] ABSTRACT

The invention relates to highly filterable polyvinyl polypyrrolidone particles and to the process for improving filterability of standard polyvinyl polypyrrolidone granules, wet cakes and slurries which comprises heating granular polyvinyl polypyrrolidone, containing a minor amount of non-crosslinked and/or unsaturated sites while maintaining between 1 wt. % and 20 wt. % moisture at a temperature of between about 50° C. and about 250° C. under a pressure of from about 5 psig. to about 200 psig. and collecting product having an average particle size distribution between about 40 and 400 mesh, a non-volatile water solubles (NVWS) content less than 2% and a filter flow rate greater than 95.

20 Claims, No Drawings

INSOLUBLE VINYL LACTAM CLARIFIERS

In one aspect, the invention relates to an improved filterable polyvinyl polylactam in a high state of purity and in another aspect, to the process which provides improved filterability of polyvinyl polylactam particles.

Water insoluble polyvinyl polypyrrolidone is a well known filtration aid for various substances, particularly, beer and other beverages and is used to remove tannin type compounds and to improve beverage clarity. These polymers form insoluble complexes with polyphenolic structures of the type commonly referred to as tannins in beer, wine, vinegar and many fruit and vegetable beverages. It is the function of the polyvinyl polypyrrolidone to act as a filter aid for the colloidal stabilization of beer and in the stabilization of color values in wines, particularly white and rose wines, and vinegar. While filtration of beverages using polyvinyl polypyrrolidone is very effective, problems have occurred which are primarily associated with the low flow rate index (FRI) of some polymers currently in use. This problem is aggravated when these polymers are regenerated for reuse. Additionally, traces of non-volatile water soluble components (NVWS) such as inorganics, unreacted monomer, and vinylpyrrolidone oligomers from the polyvinyl polypyrrolidone are found in the filtrate. These components are not easily removed by filtration and are therefore objectionable.

Accordingly, it is an object of this invention to significantly improve the FRI of polyvinyl polylactam granules by an economical and commercially feasible process.

Another object is to provide a polyvinyl polypyrrolidone clarifying agent having a high FRI while maintaining a low NVWS level.

Another object is to increase the harness of relatively soft water swellable polyvinyl polypyrrolidone particles so as to prevent aggolomeration or plugging of pores of a filter.

Still another object is to provide a highly filterable polyvinyl polypyrrolidone clarifying agent Yet another object is to provide a filtration agent for non-comestible materials in which water solubles of the type originating in the polyvinyl polylactams are not objectionable.

These and other objects of the invention will become apparent from the following description and disclosure.

According to this invention, a particulate, water insoluble vinyl lactam polymer, having an average particle size sufficient to be retained by filtering means, is subjected to a heat treatment effected at a temperature between about 50° C. and about 250° C. under a pressure of from about 1 psig. to about 250 psig. for a period of from about 1 minute to about 7 days and in the presence of a critical amount of moisture between about 1 wt. % and 20 wt. %. these operating conditions are interrelated, such that time and temperature are, for the most part, inversely related. Preferred conditions for effecting the heat treatment of the vinyl lactam polymers include a temperature between about 70° C. and about 200° C., a pressure of from ahout 5 to about 200 psig., a heating period of from about 10 minutes to 5 days in the presence of between about 3 wt. % and about 14 wt. % moisture; most preferably between about 6 wt. % and about 12 wt. % moisture.

The vinyl lactam polymers of this invention are described as "popcorn" polymers* and are comprised of one or more vinyl lactam monomers or a vinyl lactam monomer copolymerized with a vinyl comonomer copolymerizable with the present vinyl lactam, e.g. minor amount, more desirably less than 30%, of a hydroxylated alkyl acrylate or methacrylate comonomer. Homopolymers of vinyl lactams, particularly the polyvinyl polypyrrolidones, are preferred.

See Advances in chemistry Series No. 128, Published by American Chemical Society, 1973, Chapter 7, entitled "Popcorn Polymers" by J. W. Breitenbach and H. Axmann, pages 110–124.

The polyvinyl polylactam homopolymers of this invention are defined by the insoluble polymers of lactam monomers having the formula

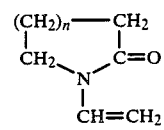

wherein n is an integer having a value of from 1 to 3. These polymeric materials can be heat treated in a dry, particulate state, or a liquid slurry or wet cake can be predried to a desired moisture content and then subjected to the present heat treatment.

It is believed that the polyvinyl polylactam, preferably polyvinyl polypyrrolidone, contains a minor amount of non-crosslinked and/or unsaturated sites in the high molecular weight polymer chains; and that, of these, polyvinyl polypyrrolidones having less than 5% by weight non-cross-linked and/or unsaturated sites would be preferred. The particle size of the polymer products can vary widely depending upon the type of filtering means employed and the initial size of the polyvinyl polylactam granules undergoing treatment.

More specifically, when a mesh screen, for example between about 100 and about 300 mesh is employed in the clarification of beverages, the average particle size distribution and hardness of the polymer particles should be such that they do not agglomerate or plug the pores of the screen. For such purposes, an average particle size greater than about 200 micrometers is conveniently employed. Conversely, when the filtering means is a membrane having small pore openings, for example between about 1 and about 10 micrometers diameter, much smaller particles of the polymer, compatible with the membrane pore size, e.g. 50 micrometers, can be used. Obtaining a specific particle size of the polymer is not a serious consideration in the present invention since smaller particles can he produced in any convenient size by well known attrition methods such as grinding, ball milling, high shear mixing, sand milling, etc. The average particle size distribution of product obtained by the present process without further grinding generally is between 10 and 400 mesh.

More troublesome are the fines of polymer particles which tend to plug the filter after short periods of use. However, it has been found that the present treatment may cause some fusion of fines to larger particles and thus reduce undesirable fine levels. This effect is particularly noticed at the higher treating temperatures and moisture levels within the designated ranges of this invention.

Many products are marketed commercially which satisfy the requirements for the present insoluble polyvinyl polylactam starting materials of this invention. These include POLYCLAR*, POLYPLASDONE*, and DIVERGAN**. Methods for the preparation of these polymers are also well known. One such method is set forth in U.S Pat. No. 2,938,017.
manufactured by GAF Corporation
manufactured by BASF According to the present process, polymeric starting materials having a relatively high NVWS content, e.g. above 2%, can be washed with water until the solubles level is reduced to under 1%, preferably under 0.5%. Alternatively the polymer can be treated directly and washed with water after treatment to reduce the solubles level when so required. In certain instances, where the NVWS level is maintained or obtained below 2 wt. % or in cases where the NVWS level is not a consideration, as in water clarification or coating solutions, water washing can be entirely eliminated. Generally, for clarification of beverages or solutions taken internally, a NVWS level of not more than 2%, preferably not more than 1.5%, is required. It has been found that the present moisture heat treating process is capable of producing product having as little as 0.35 wt. % NVWS while achieving an FRI significantly above 150.

The washed or unwashed polymeric particles of this invention are subjected to the treatment discussed above. Generally, higher temperatures provide increased filterability and somewhat higher NVWS content. However, such higher temperatures can be used for the filtration of noncomestible products or when washing of the polymer, either before or after heat treatment is contemplated to remove NVWS to an acceptable level.

Theoretically, the application of heat to the granular vinyl lactam polymeric material under the above moisture conditions, causes additional crosslinking and/or saturation of unsaturated sites remaining in the polymeric starting material. Additionally, some fusion of fines is often observed at higher temperatures and moisture levels. The granular particles of the starting material are apparently hardened during the heat treatment so that the finished product has significantly greater resistance to swelling and plugging of a filter caused by gelling.

As indicated above, the granular polyvinyl polylactam starting material is treated in a moistened state; however, treatment of aqueous suspensions or slurries of the particulate polymer provides less desirable results. This can be remedied by partially drying the suspension to a moisture content within the above ranges. Generally, the polymeric material is heated in an autoclave, closed heat exchanger or any other convenient sealed vessel, preferably in a sealed rotating drum or oven which provides means of agitation for more uniform conditions. The heat treated particulate solids are collected, optionally water washed to remove low molecular weight contaminants and then dried for packaging and use. If desired, the dried particles of approximately 40 to 400 mesh size can be ground to finer size to meet specifications for specialized uses.

In cases where the FRI has not achieved the desired level, the treatment process of this invention can be repeated to provide significant improvement.

For the treatment of beverages, the treated particles of this invention can be slurried in water, poured onto a filter to form a filter cake through which the beverage can be filtered at a very high rate, e.g. at a pressure of 2m $H_2O$, more than 5 hectaliters/hr. can be filtered through $1m^2$ of bed containing 12.5 $Kg/m^2$. Alternatively the beverage or liquid to be clarified may be slurried with the polymeric product and then filtered. During this filtration process, anthrocyanogens, natural proteins, tannin protein complexes, tannins and other color or haze forming bodies are removed from the beverage with a higher degree of clarification than has been achieved heretofore at such high filtration rates.

When the filtration rate falls below the desired limit, the polymeric products are easily regenerated, eg. by washing the filter cake with caustic and then with water until the contaminant level is below about 1%. The clarifying polymeric agent is then partially dried to the desired moisture content and is ready for reuse. The regeneration process can be effected at ambient temperature and pressure or at a higher temperature and pressure, if desired.

Product testing for FF and NVWS is effected as follows. The pressure filter apparatus for the flow rate determination consists of a stainless steel barrel (25 cm long×50 mm I.D.), filter support (50 mm stainless steel screen with 3 mm diameter holes) and outlet tube. The filter support is fitted with filter paper (Schenk Filterschichten D*, 60 mm diameter) before each analysis. The filter apparatus inlet is connected with Tygon tubing to a thermostated (20° C.±2° C.) water reservoir at a height of 200 cm from the filter support (equivalent to 0.2 bar pressure). A quantity (4.0 g. on a dry basis) of sample, swollen in 200 ml distilled water (20° C.) for 24 hours, is added to the barrel of the filter apparatus. The barrel is reassembled and filled with water. The filter bed is established by allowing 500 ml of pressurized water to pass through the apparatus. The time required for an additional 100 ml of water to pass through the filter bed is used to calculate the filtration flow (FF):

$FF=4608/t$ where
t time in seconds

The procedure for determining the flow rate index (FRI) is identical to that for FF except that Schleicher and Schuell #589$^2$ filter paper is used instead of the Schenk Filterschichten D paper.

available from Schenk Filterban Gm. BH, D-7070 Schwabisch Gmund, West Germany

To determine the percent non-volatile water solubles (NVWS) in the polyvinyl polypyrrolidone product, a 25 g. sample is slurried for 1 hour in 200 ml of deionized water and diluted to volume in a 250 ml volumetric flask. The polymer is allowed to settle and the supernatant removed and filtered through a 0.45 micron membrane, after which 25 ml of supernatant is evaporated to dryness and weighed. The weight of residue is multiplied by 40 to calculate the % NVWS content in the sample.

Having thus described the invention, reference is now had to the accompanying examples which are presented to illustrate preferred embodiments but which are not to be construed as limiting to the scope of the invention as more generally described above and in the appended claims.

EXAMPLES 1–10

The FRI of ten samples of POLYCLAR ®-AT powder (insoluble polyvinyl polypyrrolidone containing less than 10% non-crosslinked and/or unsaturated sites, having a moisture content of not more than 5%, a number average molecular weight above 100,000 and an average particle size of about 40–400 mesh), was measured in the manner described above and the FRI values recorded as reported in Table I. One hundred pounds of each of the ten samples was then sealed in a polyethylene lined fiber pack 30 gal. drum and heated for 4 days at 70°–75° C. Heating was then discontinued, the FRI of each heat treated sample was again measured and the values recorded as reported in Table I.

TABLE I

| Example No. | FRI Before Heat Treatment | FRI After Heat Treatment | % NVWS |
|---|---|---|---|
| 1 | 26 | 66 | <1.0 |
| 2 | 26 | 68 | <1.0 |
| 3 | 45 | 90 | <1.0 |
| 4 | 53 | 78 | <1.0 |
| 5 | <10 | 76 | <1.0 |
| 6 | <10 | 68 | <1.0 |
| 7 | 27 | 61 | <1.0 |
| 8 | 27 | 62 | <1.0 |
| 9 | 21 | 82 | <1.0 |
| 10 | 21 | 54 | <1.0 |

This comparison showed that, in all cases, the FRI was significantly increased and the NVWS content was maintained at a low level. Encouraged by these results, additional experiments were conducted to determine what degree of FRI improvement, if any, could be achieved at higher temperatures in shorter periods and at higher moisture levels.

EXAMPLES 11–29

The procedure outlined above in Examples 1–10 was repeated except that the Polyclar untreated samples, having a flow rate (FF) of about 55, were humidified to a moisture content of 5.76%. The treatment temperature and duration were varied as reported below in Table II. The heat treatment for these examples was effected in sealed vessels and rotated in an oven, e.g. a roller oven (RO) which provided constant humidity and agitation of the Polyclar particles. The ambient pressure developed during treatment was between about 15 and 25 psig. depending on the temperature.

After treatment the samples were allowed to cool and the FF was again determined, the values of which are also reported in Table II.

TABLE II

| Ex. No. | Temp. °C. | Treat. Time (hrs.) | Final % Moisture | Final FF | Final NVWS |
|---|---|---|---|---|---|
| 11 | 105 | 12 | 5.66 | 87 | 0.53 |
| 12 | 105 | 24 | 5.53 | 100 | 0.66 |
| 13 | 105 | 48 | 5.12 | 123 | 1.17 |
| 14 | 105 | 24 | 5.81 | 102 | 0.84 |
| 15 | 95 | 12 | 6.05 | 78 | 0.58 |
| 16 | 95 | 24 | 6.10 | 89 | 0.69 |
| 17 | 95 | 48 | 5.64 | 80 | 0.68 |

The above procedure for Examples 11–17 was repeated except that the moisture content of the untreated Polyclar samples was increased to 11.7%. The results of these experiments are reported in Table III.

TABLE III

| Ex. No. | Temp. °C. | Treat. Time (hrs.) | Final % Moisture | Final FF | Final NVWS |
|---|---|---|---|---|---|
| 18 | 105 | 12 | 11.25 | 132 | 0.22 |
| 19 | 105 | 24 | 11.78 | 155 | 0.74 |
| 20 | 105 | 48 | 11.49 | 184 | 0.63 |
| 21 | 105 | 48 | 12.15 | 142 | 0.74 |
| 22 | 105 | 24 | 11.64 | 154 | 0.52 |
| 23 | 105 | 12 | 12.19 | 130 | 0.50 |
| 24 | 105 | 12 | 11.75 | 90 | 0.58 |
| 25 | 105 | 24 | 11.41 | 90 | 0.52 |
| 26 | 105 | 48 | 11.63 | 86 | 0.93 |
| 27 | 95 | 12 | 11.45 | 90 | 0.60 |
| 28 | 95 | 24 | 11.75 | 109 | 0.53 |

TABLE III-continued

| Ex. No. | Temp. °C. | Treat. Time (hrs.) | Final % Moisture | Final FF | Final NVWS |
|---|---|---|---|---|---|
| 29 | 75 | 48 | 11.81 | 87 | 0.72 |

EXAMPLES 30–37

The effects of higher treating temperatures at shorter durations and uncontrolled moisture during treatment were tested using the procedure described above for Examples 11–29, except that unsealed vessels in a forced air oven were employed for the heat treatment. The results of these experiments are reported in Table IV.

TABLE IV

| Ex. No. | Temp. °C. | Treat. Time (hrs.) | Final % Moisture | Final FF | Final NVWS |
|---|---|---|---|---|---|
| 30 | 130 | 1 | 0.53 | 96 | 0.90 |
| 31 | 130 | 2 | 0.73 | 125 | 1.84 |
| 32 | 130 | 2 | 6.67* | 107 | 0.86 |
| 33 | 130 | 4 | 0.71 | 147 | 4.36 |
| 34 | 130 | 4 | 6.40* | 104 | 1.01 |
| 35 | 150 | 1 | 0.51 | 136 | 2.29 |
| 36 | 150 | 1 | 5.40* | 106 | 0.81 |
| 37 | 90 | 14 | 1.91 | 66 | 2.46 |

*Samples water washed to reduce NVWS after the heat treatment and the samples remoistened as a result of the water wash are dried at 60° overnight.

The above data indicates that the moisture content of the particles throughout the heat treatment is critical for achieving the higher FF values obtainable for a given sample and that, although remoisturization results from subsequent water washing to lower NVWS content, the lower FF values obtained in the open system are not improved.

EXAMPLES 38–61

The procedure described in Examples 11–29 was repeated except that in some cases a convection oven (CO) was substituted for the roller oven (RO) in the heat treatment. The moisture content of the untreated polyvinylpolypyrrolidone particles varied as reported below in Table V. The initial FF and NVWS of the untreated samples for Examples 38–61 were 70 and 0.22% respectively.

TABLE V

| Ex. | Equip. | Temp. °C. | Treat. Time (hrs) | Initial/Final % Moist. | Final FF | Final NVWS |
|---|---|---|---|---|---|---|
| 38 | CO | 105 | 12 | 2.5/2.45 | 107 | 0.39 |
| 39 | CO | 105 | 12 | 10.7/10.77 | 196 | 0.35 |
| 40 | CO | 105 | 24 | 2.5/3.06 | 107 | 0.75 |
| 41 | CO | 105 | 24 | 10.7/11.09 | 214 | 0.57** |
| 42 | CO | 105 | 48 | 2.5/3.23 | 110 | 0.63 |
| 43 | CO | 105 | 48 | 10.7/11.11 | 209 | 0.60** |
| 44 | CO | 90 | 12 | 6.0/5.87 | 69 | 0.56 |
| 45 | CO | 90 | 12 | 11.0/11.37 | 138 | 0.69** |
| 46 | CO | 90 | 24 | 6.0/5.76 | 80 | 0.78 |
| 47 | CO | 90 | 24 | 11.0/11.57 | 154 | 0.61** |
| 48 | CO | 90 | 48 | 6.0/5.9 | 85 | 0.88 |
| 49 | CO | 90 | 48 | 11.6/11.47 | 168 | 0.89** |
| 50 | RO | 105 | 12 | 2.5/3.06 | 110 | 0.54 |
| 51 | RO | 105 | 12 | 10.7/11.67 | 105 | 0.34 |
| 52 | RO | 105 | 24 | 2.5/3.37 | 104 | 0.84 |
| 53 | RO | 105 | 24 | 10.7/11.42 | 91 | 0.37 |
| 54 | RO | 105 | 48 | 2.5/3.03 | 123 | 0.88 |
| 55 | RO | 105 | 48 | 10.7/11.15 | 114 | 0.53 |
| 56 | RO | 90 | 12 | 6.0/5.72 | 70 | 0.47 |
| 57 | RO | 90 | 12 | 11.0/11.87 | 83 | 0.52 |
| 58 | RO | 90 | 24 | 6.0/5.72 | 75 | 0.62 |
| 59 | RO | 90 | 24 | 11.0/12.03 | 97 | 0.64 |
| 60 | RO | 90 | 48 | 6.0/5.68 | 76 | 0.66 |

TABLE V-continued

| Ex. | Equip. | Temp. °C. | Treat. Time (hrs) | Initial/Final % Moist. | Final FF | Final NVWS |
|---|---|---|---|---|---|---|
| 61 | RO | 90 | 48 | 11.0/11.74 | 98 | 0.57** |

**noticeable reductions in particle fines - some fusion had occurred.

EXAMPLES 62–68

Various samples of particulate polyvinyl polypyrrolidone filter aids having the following properties were tested under the conditions of this invention.

| | Initial Properties | | | |
|---|---|---|---|---|
| | % H$_2$O | FF | NVWS | % Fines* |
| Sample 1 | 5.96 | 70 | 0.48 | — |
| Sample 2 | 2.93 | 70 | 0.22 | 19.10 |
| Sample 3 | 3.72 | 74 | 0.21 | 22.84 |
| Sample 4 | 3.25 | 80 | 0.24 | 28.24 |
| Sample 5 | 3.51 | 80 | 0.32 | 25.39 |
| Sample 6 | 4.09 | 71 | 0.27 | 31.01 |
| Sample 7 | 4.20 | 65 | 0.28 | 27.12 |

*wt % of particles passing through a 200 mesh screen

The above samples were subjected to treatment according to the present invention by following the procedure described in Examples 38–61. The results of these tests are reported in following Table VI. All samples were heated at 105° C. for 24 hours.

TABLE VI

| Ex. No. | Sample # | Equip. | Initial/Final % Moisture | Final FF | Final NVWS |
|---|---|---|---|---|---|
| 62 | 1 | CO** | 6.0/5.82 | 112 | 0.84 |
| 63 | 2 | CO | 2.5/3.56 | 122 | 0.72 |
| 64 | 3 | CO | 3.52/3.92 | 118 | 0.17 |
| 65 | 4 | CO | 3.26/3.39 | 113 | 0.45 |
| 66 | 5 | CO | 3.56/3.55 | 108 | 0.46 |
| 67 | 6 | CO | 4.12/4.15 | 110 | 0.61 |
| 68 | 7 | CO | 4.27/4.11 | 115 | 0.89 |

**Convection oven; sample not rotated

EXAMPLES 69–75

The procedure described in Examples 62–68 with the same samples was repeated except that the moisture content of the samples was raised to 10.6–11.3. After heating for 24 hours at 105° C. (step A), the samples were additionally heated for a period at 60° C. until the water content of the samples was less than 5% (step B). The results of these tests are reported in Table VII.

TABLE VII

| Ex. No. | Sample # | Equip. | % Water Initial/ After Step A | After Step A | | | % Water After Step B | After Step B | | |
|---|---|---|---|---|---|---|---|---|---|---|
| | | | | FF | NVWS | % Fines | | FF | NVWS | % Fines |
| 69 | 1 | CO | 11.0/11.34 | 195 | 0.71 | 25.05 | 2.76 | 214 | 0.71 | 15.44 |
| 70 | 2 | CO | 11.3/9.45 | 230 | 0.58 | 18.94 | 2.11 | 243 | 0.48 | 15.90 |
| 71 | 3 | CO | 10.77/11.69 | 263 | 0.66 | 19.49 | 3.42 | 288 | 0.60 | 17.66 |
| 72 | 4 | CO | 10.61/11.06 | 205 | 0.61 | 23.46 | 3.17 | 249 | 0.49 | 18.07 |
| 73 | 5 | CO | 10.85/11/16 | 201 | 0.60 | 22.69 | 2.79 | 224 | 0.51 | 22.68 |
| 74 | 6 | CO | 10.98/11.25 | 230 | 1.08 | 23.92 | 3.57 | 243 | 0.90 | 25.56 |
| 75 | 7 | CO | 10.85/10.80 | 205 | 0.90 | 23.22 | 3.12 | 236 | 0.80 | 21.05 |

EXAMPLES 76–106

The following tests based on Examples 11–29 and Samples 1–7 of Examples 62–68 were heated in a roller oven at 105° C. for 24 hours to test the effects of varying degrees of moisture in the heating zone. The results of these tests are reported in following Table VIII.

TABLE VIII

| Ex. No. | Sample # | % Water Initial/Final | Final FF | Final NVWS | Final % Fines |
|---|---|---|---|---|---|
| 76 | 1 | 6.0/6.75 | 114 | 1.12 | 18.57 |
| 77 | 1 | 12.3/11.88 | 236 | 0.74 | 16.30 |
| 78 | 2 | 3.36/3.54 | 121 | 0.86 | 23.74 |
| 79 | 2 | 13.4/12.19 | 236 | 0.50 | 15.76 |
| 80 | 3 | 3.52/4.30 | 112 | 0.47 | 27.27 |
| 81 | 3 | 11.9/11.77 | 307 | 0.46 | 10.45 |
| 82 | 3 | 7.0/7.33 | 177 | 0.34 | 4.19 |
| 83 | 4 | 3.26/3.42 | 138 | 0.72 | 21.58 |
| 84 | 4 | 12.2/12.16 | 272 | 0.87 | 11.94 |
| 85 | 4 | 7.0/6.87 | 132 | 0.70 | 22.51 |
| 86 | 4 | 8.0/7.89 | 150 | 0.57 | 3.88 |
| 87 | 4 | 9.0/9.06 | 188 | 0.59 | 12.95 |
| 88 | 4 | 10.0/9.80 | 205 | 0.57 | 7.88 |
| 89 | 5 | 3.56/3.60 | 115 | 0.89 | 27.85 |
| 90 | 5 | 5.0/4.80 | 130 | 0.68 | 26.40 |
| 91 | 5 | 6.0/5.78 | 136 | 0.64 | 26.33 |
| 92 | 5 | 7.0/6.67 | 149 | 0.72 | 12.97 |
| 93 | 5 | 8.0/8.15 | 171 | 0.62 | 2.02 |
| 94 | 5 | 9.0/9.07 | 192 | 0.59 | 6.02 |
| 95 | 5 | 10.0/10.63 | 192 | 0.56 | 6.00 |
| 96 | 5 | 11.0/10.70 | 219 | 0.61 | 12.25 |
| 97 | 5 | 12.0/10.89 | 279 | 0.59 | 11.14 |
| 98 | 5 | 13.0/12.67 | 271 | 0.60 | 12.05 |
| 99 | 5 | 3.56/3.64 | 132 | 0.90 | 24.97 |
| 100 | 5 | 11.9/11.64 | 263 | 0.83 | 13.92 |
| 101 | 5 | 7.0/6.47 | 128 | 0.68 | 16.26 |
| 102 | 5 | 8.0/7.76 | 157 | 0.72 | 2.55 |
| 103 | 6 | 4.12/4.26 | 134 | 0.65 | 26.02 |
| 104 | 6 | 11.9/11.79 | 224 | 0.60 | 13.86 |
| 105 | 7 | 4.27/4.33 | 107 | 0.43 | 30.16 |
| 106 | 7 | 12.10/11.79 | 230 | 0.79 | 12.82 |

Generally the above data shows that higher FF values are obtained as the moisture content increases up to levels at least high as 13%. In all cases the NVWS is maintained well below the 2% upper limit specification.

EXAMPLE 107

Two identical granular Polyclar samples of the type used in the clarification of beverages each having a moisture content of 9.3%, a filter flow rate of about 70 and NVWS content of about 0.5%, were rolled in a convection oven at 105° C. for 24 hours. After the heating treatment, the filter flow rates were again measured and were found to have increased to 192 along with NVWS which were found to be 0.74%.

One of the treated samples was then dried in a convection oven at 60° C. for 1.5 hours lowering the moisture level to 3.6 wt. % to produce a first final product. The other sample was dried in a convection oven at 90° C. for 10 minutes, reducing the moisture level to 3.6 wt. % to produce a second final product. The filter flow rate of the first final product had increased to 200 while the NVWS content was only minimally raised to 0.82%. The flow rate of the second final product was increased to 198, while the NVWS content was found to be only 0.78%, a negligible gain of only 0.04%.

In addition to the results reported in Table VII, this example illustrates how the sample can be dried without a loss in flow rate or an increase in NVWS. The example also teaches how a polyvinyl polylactam filter aid which has a relatively low efficiency rating can be remarkably improved.

EXAMPLES 108–112

A wet filter cake (about 80% $H_2O$) of insoluble polyvinyl polypyrrolidone was prepared by heating vinylpyrrolidone, caustic and water at 90°–130° C. to form a solid polyvinyl polyoyrrolidone deposit. The deposit was washed with water and filtered to form a cake. A sample containing 4 g. of the polyvinyl polypyrrolidone, having an average particle size of about 10–40 mesh and an initial FRI of 150, was heated in an oven for 1–6 hours and at 90° C., 110° C. and 130° C. as reported in Table IX. After heat treating, the FRI values were measured and the values reported in Table IX.

TABLE IX

| Example No. | Time | Pressure | FRI Temperature | | |
|---|---|---|---|---|---|
| | | | 90° C. | 110° C. | 130° C. |
| 108 | 1 hour in air | ambient | 198 | 165 | 225 |
| 109 | 2 hours in air | ambient | 191 | 197 | 250 |
| 110 | 4 hours in air | ambient | 198 | 241 | 351 |
| 111 | 4 hours | 1 mm Hg | 163 | 152 | 165 |
| 112 | 6 hours in air | ambient | 225 | 307 | 320 |

The above results show that while some slight improvement in FRI is achieved under vacuum, the greatest increase is achieved at higher pressure. At still higher temperatures, e.g. up to 250° C. significant FRI increase is achieved in much shorter heating periods, e.g. as little as 1 minute up to about 15 minutes.

EXAMPLE 113

A wet cake sample containing 4 g. of polyvinyl polypyrrolidone prepared as in Examples 108–112, having an average particle size of about 10–40 mesh and an initial FRI of 123, was heated for 4 hours at 130° C. After heat treating, the FRI was again measured and was found to be 250.

EXAMPLE 114

A wet cake sample containing 4 g. of polyvinyl polypyrrolidone prepared as in Examples 108–112, having an average particle size of about 10–40 mesh and an initial FRI of 44, was heated for 4 hours at 130° C. After heat treating the FRI was again measured and was found to be 271.

EXAMPLES 115–120

The wet filter cakes of six samples of insoluble polyvinyl polypyrrolidone, similar to the sample of Example 114, having an average particle size of 10–40 mesh, were slurried in water (20% solids) and spray dried to contain less than 5% moisture, thus reducing the particle size to 50–400 mesh. The FRI values of these spray dried samples were measured and the values recorded as is reported in Table X. The sample of Example 120 was again slurried in water to provide a suspension of 20% solids. This sample and the remaining dried samples were then each subjected to heating at 130° C. for 4 hours in a sealed autoclave. The FRI values of the heated samples were again measured and reported as in following Table X.

TABLE X

| Ex. No. | Initial FRI | Wt % Moisture (1) | FRI After Heat Treatment |
|---|---|---|---|
| 115 | 46 | 3–4 | 122 |
| 116 | 23 | 3–4 | 72 |
| 117 | 52 | 3–4 | 130 |
| 118 | 37 | 3–4 | 95 |
| 119 | 26 | 3–4 | 78 |
| 120 | 26 | 3–4 | 199 |

(1) of sample subjected to treatment

EXAMPLE 121

A sample of the starting material of Example 114 containing 4 g. of polyvinyl polypyrrolidone in a substantially dry state is subjected to 265° C. heat for a period of 20 minutes. The FRI of this sample fell below the initial FRI of 46 and the polyvinyl polypyrrolidone particles were discolored and large and small particles were fused. Accordingly, temperatures in excess of 250° C. should be avoided.

EXAMPLE 122

A 36.5 g. sample of powdered polyvinylpolypyrrolidone (POLYCLAR®AT) was slurried in 365 g. of distilled water, sealed in an autoclave and gradually heated to 180° C. and held at that temperature for 5 minutes The autoclave was then cooled to room temperature and the contents discharged. The treated slurry was reduced to a 22.2 wt. % solids filter cake by applying vacuum in a Buchner funnel. The filter flow (FF) of the product was found to be 62.

The above slurry containing about 90% water, showed no improvement in filter flow after heat treatment.

EXAMPLES 123–128

The following tests on Sample 1 of Example 62 were run using a rotating, glass vessel in an air circulating oven to test the effects of increased temperature and reduced processing time at controlled moisture levels. The results of these tests are reported in the following Table XI.

TABLE XI

| Ex. No | % Moisture Before Treatment/ After Treatment | Temp. °C. | Time Hrs. | FF | NVWS |
|---|---|---|---|---|---|
| 123 | 8.3%/6.33% | 125 | 12 | 205 | 0.61 |
| 124 | 7.2/4.67 | 145 | 12 | 243 | 0.50 |
| 125 | 7.2/4.02 | 145 | 8 | 188 | 0.50 |
| 126 | 7.2/4.40 | 145 | 4 | 188 | 0.57 |
| 127 | 6.5/3.02 | 165 | 8 | 271 | 0.63 |
| 128 | 6.5/3.55 | 165 | 4 | 243 | 0.76 |

EXAMPLES 129–137

Since the glass vessel in Examples 123–128 did not maintain % moisture throughout heat treatment process, as evidenced by difference in % moisture before and after treatment, a stainless steel pressure vessel was substituted for the glass vessel and the following tests were performed in the manner similar to those of Examples 123–128 above. The results of these tests are reported in the following Table XII.

TABLE XII

| Ex. No | % Moisture Before Treatment/ After Treatment | Temp. °C. | Time Hrs. | FF | NVWS |
|---|---|---|---|---|---|
| 129 | 7.9/7.52 | 125 | 12 | 264 | 2.04 |
| 130 | 7.9/7.94 | 125 | 8 | 230 | 1.87 |
| 131 | 7.9/7.75 | 125 | 4 | 219 | 1.54 |
| 132 | 6.8/6.80 | 145 | 8 | 384 | 2.02 |
| 133 | 6.8/6.74 | 145 | 4 | 318 | 2.11 |
| 134 | 6.8/6.68 | 145 | 2 | 243 | 2.13 |
| 135 | 5.8/6.00 | 165 | 4 | 461 | 1.53 |
| 136 | 5.8/5.72 | 165 | 2 | 384 | 1.78 |
| 137 | 4.8/4.76 | 185 | 2 | 440 | 1.38 |

The above tests provided even better improvement in FF when the % moisture was held constant during treatment. The NVWS also increased when the stainless steel vessel was substituted for the glass vessel; however the flow rates of Examples 123–128 were well above acceptable levels.

EXAMPLES 138–140

To confirm the unexpected effect of increased NVWS when stainless steel was substituted for glass the following tests were performed. Example 138 was tested in a glass vessel and rotated during heat treatment; Example 139 was tested in a glass vessel but stainless coupons were added to the vessel and Example 140 was tested in a stainless steel vessel but not rolled during the heat treatment process. All tests employed the polyvinylpolypyrrolidone of Sample 1 in Example 62. The results of these tests are reported in following Table XIII.

TABLE XIII

| Ex. No | % Moisture Before Treatment/ After Treatment | Temp. °C. | Time Hrs. | FF | NVWS |
|---|---|---|---|---|---|
| 138 | 7.90/6.33 | 125 | 12 | 188 | 0.74 |
| 139 | 7.90/6.63 | 125 | 12 | 209 | 1.46 |
| 140 | 7.90/7.45 | 125 | 12 | 230 | 1.94 |

It appears that the treatment time can be shortened in the presence of stainless steel, perhaps due to a catalytic effect of the metal. However, most of the tests using a stainless steel vessel provided a treated polyvinylpolypyrrolidone product having NVWS within acceptable limits. In those cases where the NVWS content exceeded 2%, and where the product was to be used in beverage clarification, water washing of the product can be used to reduce NVWS below the 2% level. In other applications, e.g. water purification, higher NVWS are acceptable.

What is claimed is:

1. The process of subjecting a normally solid, water insoluble vinyl lactam polymer having an FRI less than 100 containing not more than a minor amount of non-cross-linked and/or unsaturated sites to a temperature of from about 50° C. to about 250° C. in the presence of from about 1 wt. % and about 20 wt. % moisture under a pressure of from about 1 psig. to about 250 psig. for a period sufficient to increase the FRI above 95.

2. The process of claim 1 wherein the vinyl lactam polymer is polyvinyl polypyrrolidone in particulate form.

3. The process of claim 2 wherein the polyvinyl polypyrrolidone particles are subjected to a temperature of from about 70° C. to about 200° C. under a pressure of from about 5 to about 200 psig. while maintaining a moisture level at between about 3 wt. % and about 14 wt. %.

4. The process of claim 1 wherein the vinyl lactam polymer in particulate form is subjected to said treatment for a period of from 1 minute to 7 days.

5. The process of claim 4 wherein said vinyl lactam polymer is polyvinylpolypyrrolidone.

6. The process of claim 1 wherein the vinyl lactam polymer as a water-washed filter cake containing up to 20% water is subjected to said treatment.

7. The process of claim 6 wherein said filter cake is subjected to a temperature of from about 70° C. to about 200° C. under a pressure of from about 1 to about 200 psig.

8. The product of the process of claim 3.
9. The product of the process of claim 4.
10. The product of the process of claim 5.
11. The product of the process of claim 6.
12. The product of the process of claim 7.

13. The process of clarifying a liquid by contacting said liquid with the product of claim 1 and then filtering.

14. The process of claim 13 wherein said liquid is passed through a filter bed of said product.

15. The process of claim 13 wherein said liquid is slurried with said product and then filtered.

16. The process of filtering a beverage after contacting said beverage with the product of claim 3.

17. The process of filtering a beverage after contacting said beverage with the product of claim 4.

18. The process of filtering a beverage after contacting said beverage with the product of claim 5.

19. The process of filtering a beverage after contacting said beverage with the product of claim 6.

20. The process of filtering a beverage after contacting said beverage with the product of claim 7..

* * * * *